United States Patent
Dombrowski et al.

(10) Patent No.: US 9,181,130 B2
(45) Date of Patent: Nov. 10, 2015

(54) REDISPERSIBLE POLYMER POWDER COMPOSITIONS PREPARED FROM STYRENE BUTADIENE-BASED LATEX FOR DRY MIX FORMULATIONS

(75) Inventors: Jürgen Dombrowski, Halle (DE); Hartmut Kühn, Halle (DE); Margarita Perello, Dubendorf (CH); Gerold A. Lohmüller, Baden-Baden (DE); Etienne Lazarus, Marienthal (FR)

(73) Assignee: Dow Global Technologies LLC, Midland, MI (US)

( * ) Notice: Subject to any disclaimer, the term of this patent is extended or adjusted under 35 U.S.C. 154(b) by 739 days.

(21) Appl. No.: 13/159,838

(22) Filed: Jun. 14, 2011

(65) Prior Publication Data

US 2011/0306705 A1 Dec. 15, 2011

Related U.S. Application Data

(60) Provisional application No. 61/397,635, filed on Jun. 15, 2010.

(51) Int. Cl.
*C08L 13/00* (2006.01)
*C04B 28/02* (2006.01)
*C04B 40/00* (2006.01)
*C08J 3/12* (2006.01)
*C08L 71/02* (2006.01)
*C04B 103/00* (2006.01)
*C08K 3/36* (2006.01)
*C08L 29/04* (2006.01)

(52) U.S. Cl.
CPC ............. *C04B 28/02* (2013.01); *C04B 40/0042* (2013.01); *C08J 3/12* (2013.01); *C08L 13/00* (2013.01); *C08L 71/02* (2013.01); *C04B 2103/0057* (2013.01); *C08J 2313/02* (2013.01); *C08J 2325/10* (2013.01); *C08J 2329/04* (2013.01); *C08J 2371/02* (2013.01); *C08K 3/36* (2013.01); *C08L 29/04* (2013.01); *C08L 2201/56* (2013.01)

(58) Field of Classification Search
CPC ......... C08L 13/00; C08L 71/02; C08L 25/10; C08L 2666/22; C08L 9/06; C04B 24/2676; C04B 24/32; C04B 28/02; C04B 40/0042; C08J 2313/02; C08J 2325/10; C08J 2329/04
USPC ......... 524/5, 265, 315, 503, 802–803; 525/57, 525/134, 227
See application file for complete search history.

(56) References Cited

U.S. PATENT DOCUMENTS

| | | | |
|---|---|---|---|
| 3,234,154 A * | 2/1966 | Martin | 524/8 |
| 3,822,230 A | 7/1974 | Nelson | |
| RE28,780 E | 4/1976 | Bergmeister et al. | |
| 4,049,590 A | 9/1977 | Falkenstein et al. | |
| 4,273,901 A | 6/1981 | Gibbs et al. | |
| 4,478,974 A | 10/1984 | Lee et al. | |
| 5,498,665 A * | 3/1996 | Schulze et al. | 525/57 |
| 5,578,668 A * | 11/1996 | Colombet et al. | 524/265 |
| 6,291,573 B1 | 9/2001 | Pakusch et al. | |
| 6,590,022 B1 | 7/2003 | Bastelberger et al. | |
| 6,632,861 B1 | 10/2003 | Weitzel et al. | |
| 6,699,339 B2 | 3/2004 | Adler et al. | |
| 8,317,916 B1 * | 11/2012 | Dongell | 106/705 |
| 2002/0062006 A1 | 5/2002 | Sandor et al. | |
| 2002/0120043 A1 | 8/2002 | Rothenhausser et al. | |
| 2003/0078180 A1 * | 4/2003 | Munoz et al. | 510/407 |
| 2004/0097622 A1 | 5/2004 | Weitzel | |
| 2007/0004834 A1 | 1/2007 | Pakusch et al. | |
| 2007/0037925 A1 | 2/2007 | Weitzel et al. | |
| 2007/0167539 A1 | 7/2007 | Pietsch et al. | |
| 2008/0132624 A1 * | 6/2008 | Killat et al. | 524/265 |

FOREIGN PATENT DOCUMENTS

| | | |
|---|---|---|
| DE | 2049114 | 4/1972 |
| DE | 19853420 A1 | 5/2000 |
| DE | 10040826 A1 | 3/2002 |
| DE | 10064083 A1 | 7/2002 |
| DE | 10322787 A1 | 12/2004 |
| EP | 0989154 A2 | 3/2000 |
| EP | 1420001 A1 | 5/2004 |
| FR | 2861400 A1 | 4/2005 |
| GB | 1419833 | 12/1975 |
| JP | 2002069198 A | 3/2002 |
| JP | 2007524747 A | 8/2007 |
| WO | 9738042 A1 | 10/1997 |
| WO | 2005040253 A1 | 5/2005 |
| WO | 2005095495 A1 | 10/2005 |
| WO | 2009099717 A2 | 8/2009 |

* cited by examiner

*Primary Examiner* — Mark Eashoo
*Assistant Examiner* — Nicholas Hill
(74) *Attorney, Agent, or Firm* — Andrew E. C. Merriam

(57) ABSTRACT

Redispersible polymer powder compositions which include a polyglycol in admixture with a redispersible polymer powder (RDP), which powder includes a codried mixture of a carboxylated, water insoluble film-forming styrene butadiene polymer and a colloidal stabilizer, results in cement compositions having unexpectedly superior overall bonding strength and adhesion after water immersion. Use of the polyglycol provides good workability or ease of troweling during application. In addition, the RDP composition, which includes the RDP and the polyglycol, provides the cement-based composition with excellent abrasion resistance, surface appearance, and color. Also, the RDP composition provides for at least a 30% reduction, for example a 50% or more reduction in the amount of retarder or retardant employed in the dry mix formulation for cement compositions, such as self leveling flooring compounds or compositions, and cement-based tile adhesives.

7 Claims, 1 Drawing Sheet

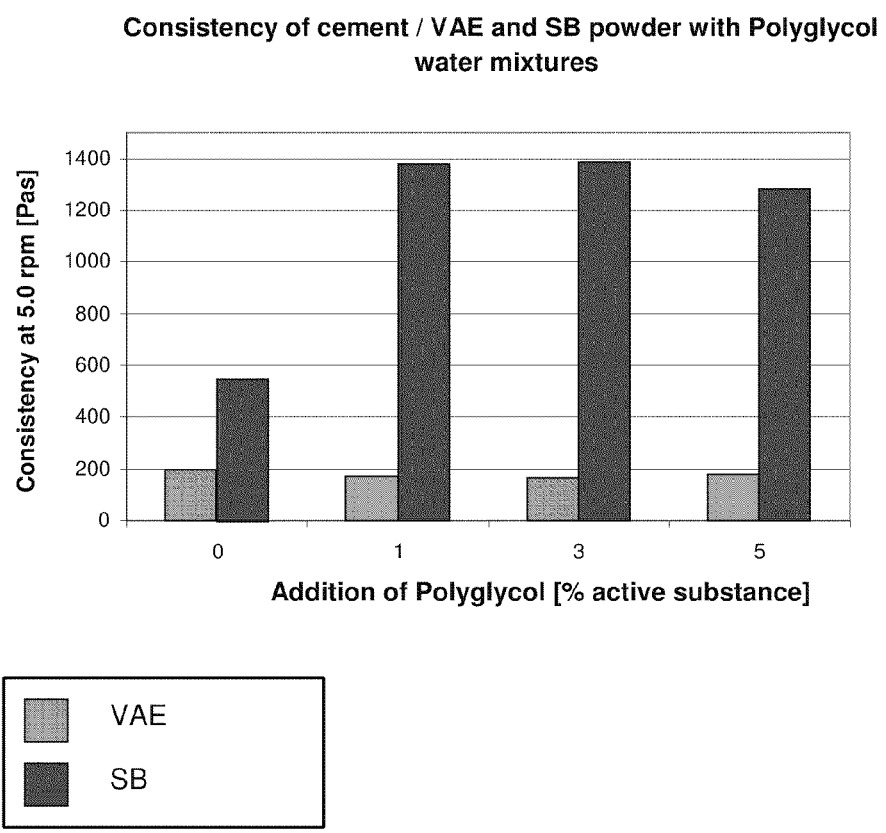

REDISPERSIBLE POLYMER POWDER COMPOSITIONS PREPARED FROM STYRENE BUTADIENE-BASED LATEX FOR DRY MIX FORMULATIONS

This application claims the benefit of priority under 35 U.S.C. §119(e) of U.S. Provisional Patent Application No. 61/397,635 filed on Jun. 15, 2010.

FIELD OF THE INVENTION

The present invention relates to redispersible polymer powder compositions which are prepared from carboxylated styrene butadiene copolymer latex and a polyglycol for dry mix formulations for use in cement compositions.

BACKGROUND OF THE INVENTION

In construction applications, mortars may be prepared with cement, sand, and organic polymer. To reduce shipping costs, the polymer can be shipped and added in dry form as a redispersible polymer powder. Redispersible polymer powders improve the adhesion and flexibility of cement based tile adhesives. The powdered form of the polymer is generally produced by spray drying a liquid polymer composition to obtain a free flowing powder. To perform its function in the application formulation to which it is added, such as cementicious systems, it is desired that in the application formulation the polymer powder is easily redispersible. Also, in preparing a redispersible polymer powder (RDP) from a latex or polymer dispersion by spray drying, a low viscosity polymer dispersion is desired to enable the use of higher solids content compositions for easier spray drying and lower pressure equipment for more efficient production of RDPs without loss of redispersibility.

The properties of adhesion, wear resistance, scratch resistance and bend resistance of hydraulically setting compositions are generally improved by adding dispersion powders. Polyvinyl acetate dispersion powders as an additive in flowable compositions are generally in dry mortar from when they are delivered to the building site, where they are simply mixed with water and spread on the floor. The materials flow out to give a smooth surface which serves directly as the wear layer or serves as substrate for further coatings. However, this usage exhibits problems, particularly when relatively thick layers are applied, such as the formation of uneven areas, such as craters or pinholes, which form on the surface. The surface does not become as smooth as the purchaser desires, and requires further work. To avoid uneven areas of this type, additives, such as fully hydrolyzed copolymers made from 1-alkylvinyl esters and from vinyl esters have been employed to eliminate these problems.

U.S. Pat. No. 6,632,861 to Weitzel et al discloses that the use of powders based on protective-colloid-stabilized vinylaromatic-1,3-diene polymers enables the use of expensive, difficult to prepare, fully hydrolyzed copolymers made from 1-alkylvinyl esters and from vinyl esters to be dispensed with, while retaining equivalent surface qualities and at the same time obtaining good wear resistance, scratch resistance and adhesion. The Weitzel et al water-redispersible, protective-colloid-stabilized dispersion powder compositions for use in self-leveling screeds or trowel-applied flooring compositions, include: a) a base polymer selected from the group consisting of the vinylaromatic-1,3-diene polymers, b) from 2 to 25% by weight, based on the base polymer, of one or more protective colloids, c) from 3 to 30% by weight, based on the total weight of polymeric constituents, of fine anti-blocking agent, and d) from 0.1 to 10% by weight, based on the base polymer, of other additives.

It has been found that the use of carboxylated styrene-butadiene redispersible powders as an additive in self-leveling flooring compounds or compositions generally improves the abrasion resistance, surface appearance, and color compared to systems modified with powders based in other chemistries like vinylacetate/ethylene copolymers. However, improvement in overall bonding strength without adversely affecting rheology in a cement-based formulation such as a self-leveling flooring composition, and a cement based tile adhesive formulation, and without adversely affecting redispersibility of the carboxylated styrene butadiene redispersible polymer powder would be highly desirable.

Mortars formulated with the carboxylated styrene butadiene redispersible polymer powder compositions of the present invention exhibit an unexpectedly superior increase in bonding strength after water immersion without adversely affecting rheology of the cementicious mortar or redispersibility of the polymer powder relative to vinylacetate/ethylene copolymer RDPs and other SB RDPs, which is advantageous for workability or ease of troweling during application. Accordingly, the present invention solves the problems of inadequate abrasion resistance, surface appearance, control of cement setting and off-colors while achieving unexpectedly superior overall bonding strength for cement compositions prepared from dry mix formulations.

SUMMARY OF THE INVENTION

The present invention provides a redispersible polymer powder (RDP) composition comprised of an admixture of a redispersible polymer powder (RDP) and a polyglycol for dry mix formulations. Addition of the polyglycol to the RDP rather than to an aqueous mixture prior to formation of the RDP by spray drying avoids any problems for redispersibility of the RDP. The RDP includes at least one water insoluble polymer prepared from at least one water insoluble, carboxylated styrene butadiene (SB) copolymer latex and a colloidal stabilizer, e.g. polyvinyl alcohol (PVOH). The water redispersible polymer powder composition of the present invention imparts an unexpectedly superior increase in overall bonding strength and adhesion after water immersion to cement-based compositions without adversely affecting workability or ease of troweling during application. In addition, the RDP composition provides the cement-based composition with excellent abrasion resistance, surface appearance, and color, and enables at least a 30% reduction, for example a 50% or more reduction in the amount of retarder employed in the dry mix formulation for cement compositions, such as self leveling flooring compounds or compositions, and cement-based tile adhesives.

The RDP comprises a co-dried admixture of a water insoluble film-forming polymer and one or more colloidal stabilizer, preferably a polyvinyl alcohol (PVOH), where the film forming polymer comprises a styrene-butadiene copolymer or the copolymerization product of styrene and butadiene with one or more other monomer. The film-forming polymer may have an amount of carboxylation of from 0.1% by weight to 15% by weight, preferably from 0.5% by weight to 10% by weight, more preferably from 1% by weight to 5% by weight, of at least one ethylenically unsaturated monocarboxylic acid and/or dicarboxylic acid, salts thereof, or mixtures thereof, preferably itaconic acid and/or maleic acid, and/or fumaric acid, based upon the total comonomer weight, or the weight of the water insoluble film forming polymer, such as a styrene butadiene copolymer with itaconic acid. The amount of polyglycol admixed with the RDP to form the RDP composition may be from 0.001% by weight to 10% by weight, preferably from 0.01% by weight to 5% by weight, more preferably from 0.1% by weight to 3% by weight, based upon the weight of the water redispersible polymer powder (RDP), or the weight of the redispersible polymer powder composition. The polyglycol, such as a polypropylene glycol, may have a number average molecular weight of from 250 to 10,000, preferably from 1500 to 6,000, and may be in the form of a dry preblend or powder with a flow agent, carrier or adsorbent such as an amorphous silica powder.

In an aspect of the present invention, the redispersible polymer powder composition may be produced by drying an aqueous mixture of the water insoluble film-forming polymer and the colloidal stabilizer to obtain the water redispersible polymer powder (RDP). An aqueous dispersion of the water insoluble film-forming polymer may be provided by polymerization, and the colloidal stabilizer may be admixed with the aqueous dispersion after polymerization, and then the aqueous dispersion may be spray dried to obtain the water redispersible polymer powder. The water redispersible polymer powder (RDP) may then be admixed with a polyglycol, to obtain a redispersible polymer powder composition of the present invention. In embodiments of the invention, the polyglycol may be preblended with a flow agent, carrier or adsorbent such as amorphous silica powder to obtain a dryblend, and the dryblend may be admixed with the redispersible polymer powder (RDP) to obtain a water redispersible polymer powder composition of the present invention. Use of the polyglycol with the RDP provides an unexpectedly superior increase in overall bonding strength and adhesion in cement-based compositions without adversely affecting workability or ease of troweling during application, provides excellent abrasion resistance, surface appearance, and color, and enables a reduction in the amount of retarder employed in the dry mix formulation for cement compositions.

In another aspect of the present invention, a cement composition such as a cement based tile adhesive, or a self leveling flooring compound or composition, may be produced by admixing cement ingredients with the water redispersible polymer powder composition made from a SB copolymer RDP and a polyglycol to obtain a cement composition, such as a mortar. The cement compositions exhibit an unexpectedly superior overall bonding strength and adhesion, and workability or ease of troweling during application, while providing excellent abrasion resistance, surface appearance, and color in the end product.

BRIEF DESCRIPTION OF THE DRAWINGS

The present invention is further illustrated by the accompanying drawings wherein:

The sole FIGURE is a graph showing the effect of polyglycol on the consistency of cement formulated with a styrene butadiene redispersible polymer powder (RDP) and a vinylacetate/ethylene (VAE) redispersible polymer powder (RDP) measured with a Brookfield Rotating T-Spindel-Helipath.

DETAILED DESCRIPTION OF THE INVENTION

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "(meth)acrylate" includes, in the alternative, acrylate and methacrylate.

As used herein, the term "(meth)acrylate" means acrylate, methacrylate, and mixtures thereof and the term "(meth)acrylic" used herein means acrylic, methacrylic, and mixtures thereof.

As used herein, unless otherwise indicated, the phrase "molecular weight" refers to the number average molecular weight as measured in conventional manner.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, unless otherwise indicated, the measured glass transition temperature ($T_g$) is used. As used herein the term "calculated $T_g$" refers to the $T_g$ of a polymer calculated by using the Fox equation (T. G. Fox, *Bull. Am. Physics Soc.*, Volume 1, Issue No. 3, page 123 (1956)). As used herein the term "measured $T_g$" means a $T_g$ that is measured using differential scanning calorimetry or DSC (rate of heating 10° C. per minute, $T_g$ taken at the midpoint of the inflection.)

The present inventors have found that redispersible polymer powders (RDPs), including a polyglycol, such as, for example, polypropylene glycol, in admixture with a redispersible polymer powder, which powder includes a carboxylated, water insoluble film-forming styrene butadiene polymer having, for example, at least one ethylenically unsaturated dicarboxylic acid monomer which provides the carboxylation, and a colloidal stabilizer such as, for example, PVOH in the redispersible polymer powder, results in cement compositions having unexpectedly superior overall bonding strength and adhesion after water immersion to cement-based compositions, without adversely affecting rheology. It provides good workability or ease of troweling during application. In addition, the RDP composition, which includes the RDP and the polyglycol, provides the cement-based composition with excellent abrasion resistance, surface appearance, and color. It has also been found that the RDP composition enables at least a 30% reduction, for example a 50% or more reduction in the amount of retarder or retardant employed in the dry mix formulation for cement compositions, such as self leveling flooring compounds or compositions, and cement-based tile adhesives. For example, characterization via bond strength or adhesion after water immersion, shows that mortars formulated with the redispersible polymer powder compositions of the present invention exhibit unexpectedly superior overall bonding and adhesion after water submersion relative to mortars formulated with vinylacetate/ethylene copolymer (VAE) or styrene butadiene redispersible polymer powders without addition of the polyglycol. Similarly, the final surface testing characteristics of phase separation, coloration, and pin holes of mortars shows improvement, plus significant improvement of abrasion resistance is achieved for polyglycol addition to SB RDPs compared to VAE RDPs which do not have polyglycol added. Compressive strength and flexural strength are also greatly improved when the retardant, e.g. trisodiumcitrate (TrNaCitrate) is reduced. Accordingly, the combination of the carboxylated styrene butadiene RDP and the polyglycol enables good redispersibility, ease of production, higher productivity, and improved end-use performance.

The polymers which may be employed in the present invention are water insoluble film-forming polymers which are carboxylated. Preferred water insoluble film-forming polymers are a styrene-butadiene copolymer or a styrene and butadiene copolymerized with other monomers with a low degree of carboxylation.

The water insoluble film-forming copolymers can be prepared by aqueous emulsion or suspension polymerization, preferably emulsion polymerization, in conventional manner, employing conventional polymerization temperatures, e.g. from 40° C. to 120° C., preferably, 70° C. or more, or, preferably, up to 105° C., and pressures, e.g. with diene comonomer pressures being 150 psi or below, preferably, 100 psi or below. The polymerization may be initiated using conventional amounts of one or more conventional water-soluble such as sodium persulphate, or oil (monomer) soluble initiator, such as t-butyl peroxide and cumene hydroperoxide, or a redox initiator combination, using a reducing agent such as sulfites and bisulfites. To control the molecular weight, conventional regulator substances or chain transfer agents, such as mercaptans, alkanols, and dimeric alpha methylstyrene can be used during the polymerization in conventional manner in conventional amounts of from 0.01 to 5.0% by weight, or, preferably, up to 3% by weight, based on the monomers to be polymerized. The polymerization process preferably takes place in known manner in the presence of conventional amounts of one or more conventional emulsifier and/or protective colloid, such as, for example, water soluble copolymers having a number average molecular weight of 2000 or more. Suitable emulsifiers include anionic, cationic and nonionic emulsifiers, for example anionic surfactants such as, for example, 8 to 18 carbon alkyl or alkyl aryl ether sulfates, and their salts, and nonionic surfactants, such as, for example, alkyl or alkyl aryl polyglycol ethers. Suitable protective colloids, instead of or in addition to one or more surfactants, may include, for example, polyvinyl alcohols; polysaccharides in water-soluble form, e.g. starches and cellulosics; proteins such as, for example, casein or soy protein; lignin sulfonates; and synthetic copolymers such as, for example, poly(meth)acrylic acid, and copolymers of (meth)acrylates with carboxyl-functional comonomer units.

One or more basic compound may be added before, during or after polymerization in an amount of 0.4 moles or more, preferably from 0.5 to 2 moles, more preferably 0.6 to 1.8 moles of carboxylic groups in the copolymer. Alternatively, the basic compound can be added in such an amount to adjust the pH of the aqueous copolymer product to 8.0 or more, or 9.5 or more, or, preferably at least 10.5, and preferably up to 12.5. The basic compound may be an inorganic basic compound, preferably a strong inorganic basic compound, such as an alkali metal hydroxide or an alkaline earth metal hydroxide, such as sodium hydroxide or potassium hydroxide.

The copolymers comprise the copolymerization product of from 20 to 79.9%, preferably, 30% or more, for example from 50% to 70% by weight, of one or more vinyl aromatic comonomer a), up to 79.9% preferably 60% or less, for example from 25% to 49% by weight of one or more 1,3-diene comonomer b) from 0.01 to 15% preferably from 0.5% to 10% or, more preferably from 1% to 5% by weight of comonomer c), and from 0 to 40%, preferably 0 to 20% or, more preferably 10% or less, by weight, of comonomer d), based on the total weight of monomers used to make the copolymer.

The comonomers and their weight proportions are chosen so as to make a copolymer having a glass transition temperature (Tg) of from −60° C. and above, preferably −20° C. or more, or, more preferably, −10° C. and above, or up to or less than 80° C., preferably up to or less than 35° C. or, more preferably up to or less than 25° C. If the Tg is too high for use in cement compositions, end use properties suffer, such as flexibility, especially in cold temperatures, and crack bridging. The Tg of the copolymers can be determined in a known manner by differential scanning calorimetry (DSC). In uses as a sacrificial binder in ceramic processing, the useful Tg of the SB RDP can be as high as 110° C., preferably 60° C.

Suitable comonomers a) include, for example, styrene, alpha-methylstyrene, $C_1$-$C_4$ alkyl-styrenes, such as o-vinyltoluene and tert-butylstyrene. Styrene is preferred. Suitable comonomers b) include, for example, 1,3-butadiene and isoprene, 1,3-butadiene being preferred. Suitable comonomers c) include, for example, ethylenically unsaturated mono-carboxylic acids, and/or di-carboxylic acids, their anhydrides, and their salts, and mixtures thereof, particularly itaconic acid and/or maleic acid and/or fumaric acid to improve the dispersibility of the redispersible copolymer powder.

Suitable optional comonomers d) include, for example, alkyl esters of (meth)acrylic acid, such as, for example, methyl methacrylate, ethylenically unsaturated carboxamides and carbonitriles, such as, for example, (meth)acrylonitrile; diesters of fumaric acid or maleic acid; hydroxy alkyl (meth)acrylates; sulfur acid monomers, phosphorus acid monomers, crosslinking comonomers, such as, for example, divinyl benzene or divinyl adipates; postcrosslinking comonomers, such as acrylamidoglycolic acid (AGA) or allyl methacrylates; epoxy-functional comonomers, such as glycidyl(meth)acrylates; and silicon-functional comonomers, such as alkoxysilane containing (meth)acrylates or vinyl monomers.

To increase the water redispersibility of the powder obtained upon drying, a basic compound, as described above, can be added prior to substantially drying the aqueous copolymer dispersion.

In a preferred embodiment, to achieve good water redispersibility and good odor control, 75% or more, preferably, 85% or more, or, more preferably, 95% or more of the total number of carboxyl groups in the copolymer are located at the surface of the copolymer latex particles in the powder particles. In such copolymers, 75% or more, preferably, 85% or more, or, more preferably, 90% or more, or, most preferably, 95% or more of the surface carboxyl groups are present in their salt form in the copolymer latex particles in the powder.

A high percentage of the carboxylic groups located at the surface of the copolymer particles obtained upon drying can be obtained by the sole use of ethylenically unsaturated dicarboxylic acid(s) as comonomer c), by staged monomer feeding, such as addition of the comonomer c) at an advanced stage of the polymerizations, or by conducting the polymerization at a pH of from 3 to 9 preferably, from 4 to 8, or, preferably 6 or higher.

The percentage of the carboxylic groups that are located at the surface of the polymer particles in the powder obtained upon drying encompasses all of the carboxylic groups located at the surface of the copolymer particles, those located in the liquid phase in low molecular weight acid aqueous solution copolymers or as free carboxylic acids or their salts, e.g. citric acid. Upon drying of the aqueous copolymer dispersion, the carboxylic groups located in the liquid phase solution copolymers deposit on the surface of the copolymer particles.

The sum of the molar amount of carboxylic groups located at the surface of the copolymer particles and the molar amount of carboxylic groups in the liquid phase of the aqueous dispersion are separately measurable in conventional manner.

In embodiments of the invention, the water insoluble film forming polymer has an amount of carboxylation as described above for comonomer c), such as, for example, from 0.1% by weight to 15% by weight, preferably from 0.5% by weight to 10% by weight, more preferably from 1% by weight to 5% by weight, of itaconic acid based upon the total comonomer weight or the weight of the water insoluble film forming polymer.

In accordance with the present invention, the water insoluble film-forming polymer in the aqueous dispersion or latex which is to be spray dried may have an average particle size of from 100 nm to 500 nm, for example from 130 nm to 350 nm.

In embodiments of the invention, the water redispersible polymer powder compositions of the present invention include a co-dried admixture of a water insoluble film-forming polymer, a colloidal stabilizer for colloidal stabilization and redispersibility of polymer powders into submicron particle sizes, and a polyglycol. Conventional colloidal stabilizers, such as polyvinyl alcohol (PVOH) may be employed as a colloidal stabilizer in conventional amounts. Preferred polyvinyl alcohols for use herein are partially hydrolyzed polyvinyl alcohols. In embodiments of the invention, the amount of PVOH or other known colloidal stabilizers employed to achieve colloidal stability may be at least 1% by weight, for example from 2% by weight to 30% by weight, preferably from 5% by weight to 20% by weight, based upon the weight of the water insoluble film-forming polymer. In preferred embodiments of the invention, the polyglycol may be added after spray drying. The polyglycol may be combined with a redispersible polymer powder (RDP) to obtain a redispersible polymer powder composition of the present invention using conventional mixing or blending equipment and methods for admixing ingredients to obtain a dry mix, preblend, or powder composition. In aspects of the present invention, the redispersible polymer powder composition may be produced by drying an aqueous mixture of the water insoluble film-forming polymer and the colloidal stabilizer, with the polyglycol to obtain a water redispersible polymer powder (RDP), or by post spraying drying addition of the polyglycol. For example, an aqueous dispersion of the water insoluble film-forming polymer may be provided by polymerization, and the colloidal stabilizer may be admixed with the aqueous dispersion after polymerization, and then the aqueous dispersion may be spray dried to obtain the water redispersible polymer powder. The water redispersible polymer powder (RDP) may then be admixed with a polyglycol, to obtain a redispersible polymer powder composition of the present invention. In embodiments of the invention, the polyglycol may be preblended with a flow agent, carrier or adsorbent such as amorphous silica powder to obtain a dryblend, and the dryblend may then be admixed with the redispersible polymer powder (RDP) to obtain a water redispersible polymer powder composition of the present invention. The redispersible polymer powder composition may be employed in a dry mix formulation for cement-based compositions in an amount of at least 0.1% by weight, for example at least 0.5%, preferably at least 1% by weight, based upon the weight of the dry mix formulation.

In accordance with the method of making the redispersible polymer powder compositions of the present invention, a water redispersible polymer powder may be produced by drying an aqueous mixture of the water insoluble film-forming polymer and a colloidal stabilizer with or without the polyglycol to obtain a water redispersible polymer powder. In embodiments, an aqueous dispersion of the water insoluble film-forming polymer obtained by polymerization, is admixed with the colloidal stabilizer, with or without the polyglycol, to obtain a substantially homogeneous aqueous dispersion which is then spray dried to obtain a water redispersible polymer powder. In one example, the viscosity of the feed to be spray-dried may be adjusted via the solids content so that a value of less than 1000 mPas (Brookfield viscosity at 20 revolutions and 23° C.), preferably less than 250 mPas, is obtained. The solids content of the dispersion to be spray-dried may generally be from 25% to 75% by weight, for example from 35% by weight to 65% by weight, preferably from 40% to 60% by weight, based on the total weight of the dispersion. To prepare the water-redispersible polymer powders, the aqueous dispersions are dried, preferably by spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 130° C. to 170° C. The outlet temperature may generally be from 45° C. to 120° C., preferably from 60° C. to 90° C., depending on the plant, the $T_g$ of the polymeric composition and the desired degree of drying.

In addition to the colloidal stabilizer and the polyglycol, conventional optional additives in conventional amounts can be added prior to drying the aqueous dispersion, such as an antifoaming agent in an amount of up to 1.5% by weight of antifoam, based on the weight of the polymer particles. Other additives which may be employed, in conventional amounts, include one or more salts, such as $CaCl_2$, and $MgCl_2$, emulsifiers or surfactants, monosaccharides, disaccharides, and anticaking agents (antiblocking agents) such as kaolin, calcium carbonates or silicates. The amount of the anticaking agent, or other inorganic fillers may be up to 40% by weight, based upon the weight of the water redispersible polymer powder (RDP). In embodiments of the invention, conventional superplasticizers may be employed in an amount of at least 0.01% by weight, preferably from 5% by weight to 25% by weight, based upon the weight of the water redispersible polymer powder (RDP).

The X50 size of the particle size distribution of the redispersible powder depends on drying conditions and drying equipment. X50 represents the median diameter in micrometers, which means that 50% by weight of the particles are smaller than this diameter. The produced water-redispersible polymer powder preferably has an X50 particle size diameter of from 5 to 100 micrometers, preferably from 20 to 100 micrometers, most preferably from 50 to 80 micrometers. The particle size distribution of the powder can be measured by laser diffraction using a particle size analyzer "Sympatec Helos" at a measuring range of 1.8-350 µm and dispersing the powder by compressed air.

The weight of the polymer particles in the powder may preferably be from 40% by weight to 95% by weight, more preferably from 65% by weight to 85% by weight, of the total weight of the water-redispersible polymer powder.

The polyglycol employed in the present invention may be any conventional polyglycol, such as a polyethylene glycol, a polypropylene glycol, or any other polyether diol or triol. In preferred embodiments, a polypropylene glycol, or polypropylene oxide, may be employed, with the end group generally being a hydroxyl group, such as in a polypropylene glycol, diol (PPG). The amount of polyglycol admixed with the RDP to form the RDP composition may be from 0.001% by weight to 10% by weight, preferably from 0.1% by weight to 5% by weight, more preferably from 0.5% by weight to 3% by weight, based upon the weight of the water redispersible polymer powder (RDP), or the weight of the redispersible polymer powder composition. The polyglycol, such as a polypropylene glycol, may have a number average molecular weight of from 250 to 10,000, preferably from 1,500 to 6,000.

The polyglycol may be employed in the form of a liquid or a solid, preferably in the form of a dry preblend or powder with a conventional flow agent, carrier or adsorbent such as an amorphous silica powder. The polyglycol in liquid form may be admixed, or preblended, with the flow agent, carrier, or adsorbent, such as amorphous silica powder until it is absorbed onto or by it to form a dry preblend or powder, which in turn may be dryblended or admixed with the RDP to form a powder or dry mix. In exemplary embodiments of the invention, the resulting polyglycol powder or dry mix may contain the flow agent, carrier, or adsorbent in an amount of from 25% by weight to 60% by weight, for example from 30% by weight to 50% by weight, based upon the total weight of the polyglycol and the flow agent, carrier, or adsorbent, such as amorphous silica powder.

The water-redispersible polymer powder compositions of the present invention have a variety of uses. In embodiments of the invention, the carboxylated styrene-butadiene redispersible polymer powder compositions of the present invention may be employed in blends with one or more acrylic redispersible polymer powders (RDPs), VAE RDPs, VAE/VeoVA RDPs, epoxy based RDPs, polyurethane RDPs, polyolefin dispersion based RDPs, and mixtures thereof. The powders of the present invention may be employed as functional additives in a wide variety of compositions such as construction materials, personal care compositions, pharmaceutical compositions, and agricultural compositions, in high salt concentration applications or environments, such as offshore oil well cementing, oil and gas drilling and cementing, and in hard water. Additional uses of the powders are in waste management applications, such as compositions for synthetic covers for bulk material piles, such as waste, coal sludge containment, soil, soil erosion control, which minimize water infiltration, nuisance fugitive dust, odor, and affinity to birds. The powders may be used in alternative landfill covers that are sprayable, use inexpensive widely available and environmentally friendly recycled materials, have good adherence to plastics and glass waste, and can form/harden within a short time, and in adhesion enhancing admixtures. The powders may also be employed in the production of foams, such as polyurethane foams.

In preferred embodiments, the water-redispersible polymer powder may be used as an additive in a setting composition which may further include an inorganic hydraulic binder. Examples of inorganic binders include cements, such as Portland cement, alumina cement, pozzolanic cement, slag cement, magnesia cement and phosphate cement; gypsum hemihydrate and water-glass. Illustrative uses of the polymer composition according to the present invention are in tile adhesives, construction adhesives, renders, joint mortars, plasters, troweling compositions, filling compositions, such as floor filling compositions (e.g. self-leveling flooring compounds), concrete repair joints, joint mortars, tape joint compounds, concrete, water proofing membrane applications, crack isolation membrane applications, and additives for ceramic processing. In particular, the use of the water-redispersible polymer powder described herein in a setting composition, e.g. in cement-based tile adhesives or in external thermal insulation composite systems, result in compositions with high initial adhesion strength, high adhesion strength after immersion in water (water resistance), and high adhesion strength after allowing a certain "open time" before final application of the hydrated setting composition. In embodiments of the invention, the water-redispersible polymer powder may be employed as a binder for slip casting, of for example raw materials such as silica, alumina, alkali metal oxides, and alkaline earth metal oxides.

A preferred use of the water-redispersible polymer powder is in cementitious or hydraulic compositions or other compositions which exhibit a high pH, for example a pH of at least 11, for example from 11.5 to 13.5. The redispersible polymer powders of the present invention may be employed in tile adhesives, such as cement-based tile adhesives. Cement-based tile adhesives may generally comprise 5 to 50 parts by weight of cement, preferably Portland cement, as the hydraulic binder; 40 to 70 parts by weight of quartz sand, preferably having a particle size of from 0.1 mm to 0.5 mm, as the main filler, and 0.1% to 10% by weight, preferably 1% to 6% by weight (based on the dry weight of the tile adhesive) of the redispersible polymer powder composition according to the present invention. Further optional components include one or more cellulose ethers (preferably in a total amount of 0.05% to 1% by weight, more preferably 0.2% to 0.5% by weight, based on the dry weight of the tile adhesive) to control rheology, water retention, slip resistance and improved workability; quartz or lime stone powder having a particle size of from 30 µm to 60 µm as fine co-filler to improve consistency and workability; and cellulose or mineral fibers to improve the slip resistance.

Another use of the water-redispersible polymer powders is in self-leveling flooring compounds SLFC. The powders may be added to improve the adhesion to the substrate, the flexibility, the abrasion resistance and the aging properties. The SLFC may generally include the same components in the same amounts as employed in the CBTAs. A retarder or retardant, such as trisodium citrate (TriNa-Citrate), such as Censperse PC13 available from Newchem AG, Pfäffikon, Switzerland, may be employed in reduced amounts, such as at least 30% by weight, preferably at least 50% by weight or more, compared to conventional amounts generally employed in SLFC. In embodiments of the invention, the retarder may be employed in an amount of less than or equal to 0.1% by weight, for example from 0.03% by weight to 0.07% by weight, based on the weight of the SLFC. The SLFC may also include calcium sulfate (gypsum), an accelerator, such as lithium carbonate, and a liquefier, dispersant, or superplasticizer, such as a water soluble co-polymer dispersant, such as MELFLUX 2651F, modified polycarboxylates (BASF Construction Polymers, Kennesaw Ga.), in conventional amounts. In other embodiments, the water-redispersible polymer powder may be used in external thermal insulation systems ETICS, particularly as an adhesive on the thermally insulating board layer to reduce the water absorption and improve the impact resistance of the external thermal insulation system.

Furthermore, the water-redispersible polymer powder according to the present invention may be used in paper products, paperboard products, carpet backing, paints or coatings or in binders for wood, paper or textiles coatings or impregnating compositions, preferably in the absence of a substantial amount of an inorganic hydraulic binding agent, more preferably in the absence of any amount of an inorganic hydraulic binding agent. For example, the water-redispersible polymer powder may be used as the sole binder in coating compositions and adhesives.

The following examples are provided for illustrative purposes only and are not intended to limit the scope of the claims that follow. Unless otherwise indicated, all parts and percentages are by weight, all temperatures are in ° C., and all pressures are in bars or atmospheric unless otherwise indicated to the contrary:

EXAMPLE 1

A redispersible polymer powder was produced by admixing: a) a water insoluble film forming carboxylated styrene butadiene (SB) latex which has a comonomer content of 62 parts styrene, 35 parts butadiene, and 3 parts itaconic acid (a carboxylation of 3% by weight of itaconic acid, based upon the total comonomer weight), with a particle size of 148 nm, and a $T_g$ of 8° C., and b) 12% by weight of MOWIOL 4-88, based upon the weight of the latex polymer. The MOWIOL 4-88 is a partially hydrolyzed PVOH (polyvinylalcohol) in granular form, and is available from Kuraray Europe GmbH, Division PVA/PVB D-65926 Frankfurt am Main, Germany. The MOWIOL 4-88 has a viscosity DIN 53015 of 4±0.5 mPa-s (4% aqueous solution at 20° C.), a degree of hydrolysis (saponification) of 87.7±1.0 mol. %, an ester value DIN 53401 of 140±10 mg KOH/g, a residual acetyl content of 10.8±0.8 w/w %, and a maximum ash content of 0.5% (calculated as $Na_2O$). The mixture has a total solids content of 38% by weight, based upon the total weight of the mixture.

This mixture may be pumped to a two-fluid nozzle atomizer equipped on a Mobile Minor spray dryer. The air pressure to the nozzle may be fixed at 3 bar with 50% flow which is equivalent to 6 kg/hr of airflow. The spray drying may be conducted in an $N_2$ environment with an inlet temperature fixed at 140° C., and the outlet temperature targeted to 50° C.±1° C. by tuning the feed rate of the mixture. Concurrently, kaolin powder (KaMin HG 90) may be added into the chamber for spray drying as an anti-caking agent, with the amount being controlled to be 12% by weight of the dry powders.

The styrene butadiene redispersible polymer powder obtained by the spray drying ("SB RDP") may have an average particle size (X50) of 58.4 µm. The spray dried powder is readily dispersed into deionized (DI) water at a 1% by weight solids level, to the original SB latex particle size distribution.

A water redispersible polymer powder composition of the present invention may be produced by admixing the redispersible polymer powder SB RDP with a polyglycol. The polyglycol employed may be VORANOL 2000L which is a polypropylene glycol, diol having an average molecular weight ($M_n$, g/mol, as extrapolated from measured OH in conventional manner) of 2000, an OH number range of 53-58 (mg (KOH)/g phthalic anhydride-pyridine solution), a viscosity at 25° C. of 320 mPa·s, a pH of 6.0 to 7.5 (water/isopropanol 6:10 mixture) and a K+Na ppm max of 5 (by flame photometry). The VORANOL 2000L polyglycol may be first admixed with a flow agent, carrier, adsorbent, or anti-caking agent, ZEOFREE 5161 which is a spray dried powder form of a precipitated silica (silicon dioxide; precipitated amorphous silica) having an average particle size of 20.0 to 35.0 micrometer, and a surface area, BET, of 160 $m^2/g$, produced by J. M. Huber Finland OY, to obtain a powder or dryblend (DB A). The polypropylene dryblend (DB A) may contain 60% by weight of polypropylene glycol and 40% by weight of precipitated silica. The polypropylene dryblend may be admixed with the SB RDP using a conventional mixer to obtain a water redispersible polymer powder composition of the present invention having 2% by weight of polypropylene glycol (active substance), based upon the weight of the SB RDP.

EXAMPLES 2-5

A redispersible polymer powder composition was produced as in Example 1 except that in Examples 2, 3, 4, and 5, the polypropylene dryblend (DB A) may be admixed with the SB RDP to obtain a water redispersible polymer powder composition of the present invention having 1% by weight, 3% by weight, 5% by weight, and 6% by weight, respectively, of polypropylene glycol (active substance), based upon the weight of the SB RDP.

COMPARATIVE EXAMPLE A

A redispersible polymer powder (SB RDP) as obtained in Example 1 was used as a comparative example of an RDP which did not contain any polyglycol (DB A) admixed with it.

COMPARATIVE EXAMPLE B

A commercially available redispersible polymer powder DLP 2000 which is a Vinylacetate-ethylene copolymer (VAE RDP) having a $T_g$ of 17° C., an ash content of 10% by weight, and is colloidally stabilized with PVOH, produced by The Dow Chemical Company, Midland, Mich. was used as a comparative example of an RDP which was not a carboxylated SB RDP and which did not contain any polyglycol (DB A) admixed with it.

COMPARATIVE EXAMPLES C, D, E, and F

Comparative redispersible polymer powder compositions C, D, E, and F were prepared by admixing: a) the Vinylacetate-ethylene copolymer RDP (VAE RDP) of Comparative Example B, and b) the polypropylene dryblend (DB A) of Example 1 to obtain water redispersible polymer powder compositions, Comparatives C, D, E, and F, having respectively 1%, 3%, 5%, and 6% by weight of polypropylene glycol (active substance), based upon the weight of the VAE RDP. Comparative examples C-F are used as comparative examples of an RDP which is not a carboxylated SB RDP and which does contain a polyglycol (DB A) admixed with it.

EXAMPLE 6

The components and their relative amounts (% by weight or parts by weight, pbw) which may be used to prepare cement-based mortar compositions using the redispersible powder compositions of Examples 1 and 2, and Comparative Examples A and B are shown in Table 1, below. The different cement-based mortar compositions may be prepared by dry blending the solid components indicated in Table 1A, and then adding water. Various properties of the cement-based mortar compositions and their performance may be tested and the results are shown in Table 1B.

Test Methods:

Dry Mix Preparation: The cement, sand, polymer, and thickener are weighed and placed into a plastic bag which is then hand mixed for 2 minutes and conditioned for 24 hrs.

CE 5.12 (Wet mortar Brookfield viscosity, wettability and density). Viscosities are measured with a Brookfield Synchro-lectric viscometer (Model RVT) in combination with a Brookfield Helipath stand at 25° C. The mortar is filled into a density cup and the spindle (T-F) is positioned such that it just touches the surface of the mortar.

Density: Mortars are placed into a container of known volume, tamped down, and then weighed.

Wettability: Amount of mortar transfer to the back of the tile

Open time: EN 1346 20 minutes, after 7 days and after 28 days.

Adhesion: EN 1348 after 28 days at room temperature, and 70° C., and water immersion.

TABLE 1A

Cement-based Mortar Formulations

| RAW MATERIAL | Formula (parts by Weight) | | | |
|---|---|---|---|---|
| | Ex. 1 SB | Ex. 2 SB | Comp. A SB | Comp. B VAE |
| Portland Cement, Jura PZ 42.5 | 40.00 | 40.00 | 40.00 | 40.00 |
| Sand Zimmerli, Silica Sand 0.1-0.45 mm | 60.00 | 60.00 | 60.00 | 60.00 |
| Polypropylene glycol | 0.06 | 0.03 | — | — |
| Redispersible Polymer Powder of Example 1 | 3.00 | — | — | — |
| Redispersible Polymer Powder of Example 2 | — | 3.00 | — | — |
| Redispersible Polymer Powder of Comparative Example A | — | — | 3.00 | — |
| Redispersible Polymer Powder of Comparative Example B | — | — | — | 3.00 |
| Methocel MC 10-0148, (hydroxypropyl methyl cellulose (HPMC) modified with starch ether, thickener (Dow Chemical Co.) | 0.40 | 0.40 | 0.40 | 0.40 |
| Total, % by weight | 103.46 | 103.43 | 103.40 | 103.40 |
| Water | 22.0 | 22.0 | 22.0 | 23.0 |

TABLE 1B

Adhesion Results

| TEST RESULTS | | | | |
|---|---|---|---|---|
| Initial Strength 28 days N/mm$^2$ | 2.83 | 1.73 | 1.89 | 1.67 |
| 20 minute Open Time 28 days N/mm$^2$ | 1.13 | 1.09 | 0.88 | 1.00 |
| Water Immersion 28 days N/mm$^2$ | 2.07 | 1.44 | 1.30 | 1.17 |
| Heat aging 28 days 70° C. N/mm$^2$ | 2.58 | 2.27 | 1.98 | 1.89 |
| Wettability % | 95 | 100 | 100 | 80 |
| Density kg/l | 1.66 | 1.49 | 1.43 | 1.51 |
| Consistency 0.5 rpm cps*1000 | 2596 | 2836 | 2611 | 2765 |
| Consistency 5 rpm cps*1000 | 583 | 469 | 506 | 425 |
| Consistency 50 rpm cps*1000 | 86 | 94 | 86 | 88 |

As shown in Table 1B, an unexpectedly superior improvement in adhesion values when styrene-butadiene carboxylated polymer powder is modified with 0.03% by weight of polyglycol (Example 2, 1% by weight polyglycol, based upon the weight of the RDP) and 0.06% by weight polyglycol (Example 1, 2% by weight polyglycol, based upon the weight of the RDP) and used as a redispersible polymer powder composition instead of the same powder non modified (Comparative Example A), or a VAE RDP which is non-modified (Comparative Example B).

In addition, eight mortar formulas for the consistency measurements were obtained by admixing 127.2 g cement, 50.4 g water and 7.2 g of the RDP compositions of Examples 2, 3, and 4, and Comparative Examples A, B, C, D, and E, according to the recipe:
Recipe: 127.2 g cement+7.2 g (powder+active substance of DB A)+50.4 g water,
where
DB A=4 pts. Zeofree 5161A+6 pts. Voranol 2000L (polyglycol); Voranol 2000L=active substance. For example,
7.2 g powder (100%) (0% active substance)
7.13 g powder (99%)+0.12 g DB A (1% active substance)
6.99 g powder (97%)+0.35 g DB A (3% active substance)
6.86 g powder (95%)+0.57 g DBA (5% active substance)

The consistency of cement/VAE and SB powder with DB A/water mixtures is shown in the sole FIGURE as a function of the amount of polyglycol added, DB A [% active substance]. The consistencies are measured with a rotating T-Spindel. As shown in the sole FIGURE, a mortar formulated with a carboxylated styrene butadiene RDP and polyglycol as in Examples 2, 3, and 4 exhibits an unexpectedly high increase in consistency compared to the consistency of SB RDP and VAE RDP which do not contain a polyglycol as in Comparative Examples A and B, respectively, and VAE RDPs which do include a polyglycol as in Comparative Examples C, D, and E. The sole FIGURE shows the different behavior of polyglycol in VAE- and SB redispersible polymer powder/cement mixtures. The increase of the consistency with the SB powder has no negative impact on the application properties. The higher consistency in the case of SB powder indicates that there is a surprising interaction between SB and cement

EXAMPLE 7

The components and their relative amounts (% by weight or parts by weight, pbw) which may be used to prepare cement-based mortar compositions using the redispersible powder compositions of Example 5, and Comparative Example F are shown in Table 2, below. The different cement-based mortar compositions may be prepared by dry blending the solid components indicated in Table 2, and then adding water. Various properties of the cement-based mortar compositions and their performance may be tested and the results are shown in Table 2.

Test Methods:

Flow and spreading: The flow is determined by measuring the diameter of the spread material in two directions perpendicular to each other. The required diameter depends on the size of the tube used. The tube described in the draft version of the EN has a diameter of 30 mm and a height of 50 mm. For this tube the required diameter for a SLFC should be >150 mm Merge properties: The merge properties are determined in many different manners. There are no defined requirements.

Viscosity: There is no defined requirement for the viscosity. An optimum viscosity, determined via a modified DIN 53 211 (6.5 mm nozzle), has a pour time ranging from 25 to 60 DIN Seconds. Above 60 DIN seconds there is the risk of entrapping too much air which cannot escape anymore. Below 25 DIN seconds the mixture tends to splash and initially formed lumps will not be re-dissolved anymore because of the missing shear forces.

Separation: The phase separation can only be subjectively determined. The mixture should not separate during the open time. The cohesive strength at different heights of the SLFC layer should therefore be equal.

Surface appearance: The determination of the surface appearance is done visually. No staining, bleeding and pinholes should be present. It is evaluated subjectively and rated on a scale from 1 (very poor) to 5 (very good).

Curing properties (green strength): The strength of the SLFC, which allows walking on it, is the criteria for the green strength. Fast setting SLFCs have to reach these properties after 3 to 4 hours. The curing is determined via the determination of the flexural- and the compressive strength according to EN 196. A compressive strength of 3-4 MPa is considered as sufficient.

Flexural and compressive strength: The flexural and the compressive strength are determined according to EN 196 after 1 d, 7 d and 28 days. The purpose of the 1 d test is described above. For the 7 d and the 28 d results there are no values specified in norms. Generally 20 MPa after 28 d is considered as sufficient. The leading materials in the market have a flexural strength of about 7 MPa (28 d) and a compressive strength of about 30 MPa (28 d).

Abrasion resistance: Requirements for the abrasion resistance, determined according to the castor chair test CEN 303, is dependent on application area (e.g. domestic, industrial floors).

TABLE 2

Cement-based Mortar Formulations and Surface Appearance, Abrasion Resistance, Compressive Strength and Flexural Strength Results

| RAW MATERIAL | Comp 7-A VAE | Ex. 7-1 SB | Ex 7-2 SB | Ex 7-3 SB |
|---|---|---|---|---|
| Portland Cement, Jura PZ 42.5 | 32.00 | 32.00 | 32.00 | 32.00 |
| Sand, Quarzsand, Silica Sand 0.1-0.45 mm | 42.32 | 42.42 | 42.37 | 42.32 |
| Limestone powder 65 micron | 12.00 | 12.00 | 12.00 | 12.00 |
| Cement, LaFarge Fondu | 6.00 | 6.00 | 6.00 | 6.00 |
| Calcium Sulfate (Gypsum) | 4.00 | 4.00 | 4.00 | 4.00 |
| Trisodium citrate retarder, Censperse PC 13 | 0.10 | — | 0.05 | 0.10 |
| Lithium carbonate, accelerator | 0.10 | 0.10 | 0.10 | 0.10 |
| Melflux 2651 F liquefier | 0.40 | 0.40 | 0.40 | 0.40 |
| Polypropylene glycol, 6% by weight of RDP | Yes | Yes | Yes | Yes |
| Redispersible Polymer Powder Composition of Comparative Example F (VAE RDP and 10% DB A) | 3.00 | — | — | — |
| Redispersible Polymer Powder Composition of Example 5 (SB RDP and 10% DB A) | — | 3.00 | 3.00 | 3.00— |
| Methocel CP 1119, (hydroxypropyl methyl cellulose ether (HPMC)) thickener (Dow Chemical Co.) | 0.40 | 0.40 | 0.40 | 0.40 |
| Total, % by weight | 100.00 | 100.00 | 100.00 | 100.00 |
| Water | 27.00 | 27.00 | 27.00 | 27.00 |
| TEST RESULTS, Properties | | | | |
| Flow Properties | 1 minute | 1 min. | 1 min. | 1 min. |
| a) Flow diameter 1", mm | 151 | 156 | 142 | 142 |
| b) Flow diameter 15", mm | 150 | 142 | 143 | 147 |
| c) Flow merge property, mm | 98 | 89 | 95 | 90 |
| d) DIN cup 1", sec | 40 | 42 | 46 | 58 |
| e) DIN cup 15", sec | 67 | 80 | 71 | 70 |
| Final Surface Characteristics | | | | |
| a) Phase Separation | <5 | 5 | 5 | 5 |
| b) Coloration | 4 | >4 | <5 | <5 |
| c) Pin Holes | 4 | 5 | 5 | 5 |
| Compressive Strength N/mm$^2$ after 3 days | 3.19 | 3.99 | 4.50 | 4.02 |
| Compressive Strength N/mm$^2$ after 7 days | 3.23 | 3.96 | 6.37 | 5.20 |
| Compressive Strength N/mm$^2$ after 28 days | 7.83 | 6.91 | 9.89 | 8.56 |
| Flexural Strength N/mm$^2$ after 3 days | 14.03 | 12.08 | 17.00 | 17.69 |
| Flexural Strength N/mm$^2$ after 7 days | 20.15 | 22.45 | 26.85 | 23.60 |
| Flexural Strength N/mm$^2$ after 28 days | 30.30 | 26.10 | 33.80 | 33.15 |
| Production Floor Test-Platten | | | | |
| Results (grams) | 30.2 10000X | 2.9 9283X | 3.8 10000X | 16.2 10000X |

As shown in Table 2, surface appearance (coloration and pin holes) is improved and unexpected improvement (10×) in abrasion resistance value is obtained when styrene-butadiene carboxylated polymer with polyglycol is used as a redispersible polymer powder composition instead of Ethylene Vinyl Acetate with polyglycol. Also, unexpectedly superior compressive strength and flexural strength values are obtained when the formulation contains 50% less of retardant (Tr-NaCitrate) compared to standard amounts, which also results in an important cost reduction.

What is claimed is:

1. A water redispersible polymer powder composition comprising an admixture of powders, wherein the admixture of powders comprises:
    a) a first powder which is a water redispersible polymer powder (RDP), said water redispersible polymer powder (RDP) comprising a co-dried admixture of a water insoluble film-forming polymer and a colloidal stabilizer, said film forming polymer comprising a carboxylated styrene-butadiene copolymer or the copolymerization product of styrene, butadiene, a carboxylic acid and one or more other monomer and
    b) a second powder comprising a polyglycol which is a polyethylene glycol, a polypropylene glycol, or any other polyether diol or triol, the amount of the polyglycol being from 0.001% by weight to 10% by weight, based upon the weight of the water redispersible polymer powder (RDP).

2. A water redispersible polymer powder composition as claimed in claim 1 wherein the amount of polyglycol is from 0.01% by weight to 5% by weight, based upon the weight of the water redispersible polymer powder (RDP).

3. A water redispersible polymer powder composition as claimed in claim 1 wherein the polyglycol is a polypropylene glycol.

4. A water redispersible polymer powder composition as claimed in claim 1 wherein the polyglycol has a number average molecular weight of from 250 to 10,000 and the water insoluble film-forming polymer is a copolymer comprising the monomers styrene, butadiene, and an unsaturated dicarboxylic acid.

5. A water redispersible polymer powder composition as claimed in claim 1 wherein the polyglycol is in the form of a dry preblend with an amorphous silica powder, the colloidal stabilizer comprises a polyvinyl alcohol, and the water insoluble film-forming polymer has an amount of carboxylation of from 0.1% by weight to 15% by weight of at least one ethylenically unsaturated dicarboxylic acid, salts thereof, or mixtures thereof, based upon the weight of the water insoluble film forming polymer.

6. A dry mix formulation comprising cement ingredients and a water redispersible polymer powder composition as claimed in any one of claims 1 to 5 in an amount of at least 0.1% by weight, based upon the weight of the dry mix formulation.

7. A dry mix formulation as claimed in claim 6 where the cement ingredients are for making a self leveling flooring composition and the dry mix contains a retardant in an amount of less than 0.07% by weight, based upon the weight of the dry mix formulation.

* * * * *